May 7, 1940.   V. F. GREAVES   2,199,662
STEADY REST FOR CAMERAS
Filed May 11, 1938   2 Sheets-Sheet 1

INVENTOR.
Valentine F. Greaves.
BY
Chas. E. Townsend.
ATTORNEY.

May 7, 1940.　　　　V. F. GREAVES　　　　2,199,662
STEADY REST FOR CAMERAS
Filed May 11, 1938　　　2 Sheets-Sheet 2

INVENTOR.
Valentine F. Greaves.
BY
Chas. E. Townsend.
ATTORNEY.

Patented May 7, 1940

2,199,662

UNITED STATES PATENT OFFICE 2,199,662

STEADY REST FOR CAMERAS

Valentine F. Greaves, Oakland, Calif.

Application May 11, 1938, Serial No. 207,260

5 Claims. (Cl. 95—86)

This invention relates to cameras, and particularly to a steady rest whereby a camera may be rigidly supported during exposure of a film.

The taking of clear, well defined photographs or pictures, whether it be still or moving pictures, depends upon a steady, vibrationless support for the camera during exposure of the film. For this reason, a heavy tripod or similar support is usually recommended, but few individuals will bother with a tripod as it is bulky and cumbersome to carry. Besides that, when taking moving pictures of a person or other object which is moving about, it is difficult to keep the object in the field of the finder when the camera is mounted on a tripod. Hence, most individuals will do without a tripod and get along as best they can.

The object of the present invention is to provide a steady rest whereby a camera may be rigidly held against the head of the user during the taking of pictures; to provide a steady rest which forms a three-point support for the camera; to provide a steady rest which is detachable and which may be applied to cameras of different makes; and further, to provide a steady rest for cameras which is sufficiently small to be readily carried in the pocket or other convenient place.

The steady rest is shown by way of illustration in the accompanying drawings, in which Fig. 1 is a perspective view showing the steady rest applied to the handle of a camera, said view also showing the manner in which the steady rest is used;

Figure 2:
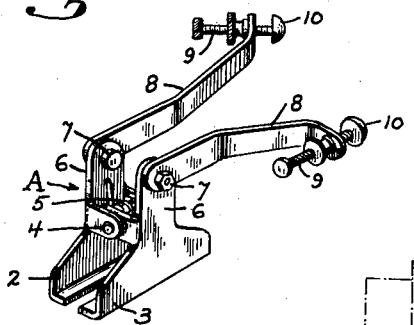
Fig. 2 is a perspective view of the steady rest.
Figure 3:
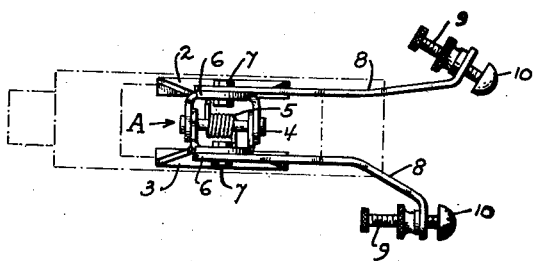
Fig. 3 is a plan view thereof.

Referring to the drawings in detail, and particularly to Figs. 2 and 3 A indicates in general a clamp, consisting of a pair of jaws 2 and 3 pivoted with relation to each other as at 4, and actuated by a spring 5. Each jaw is provided with a finger grip or extension 6, and secured thereto as at 7 are arms 8, at the outer ends of which are mounted adjustable screws 9 terminating in rubber buttons 10.

Figure 1:
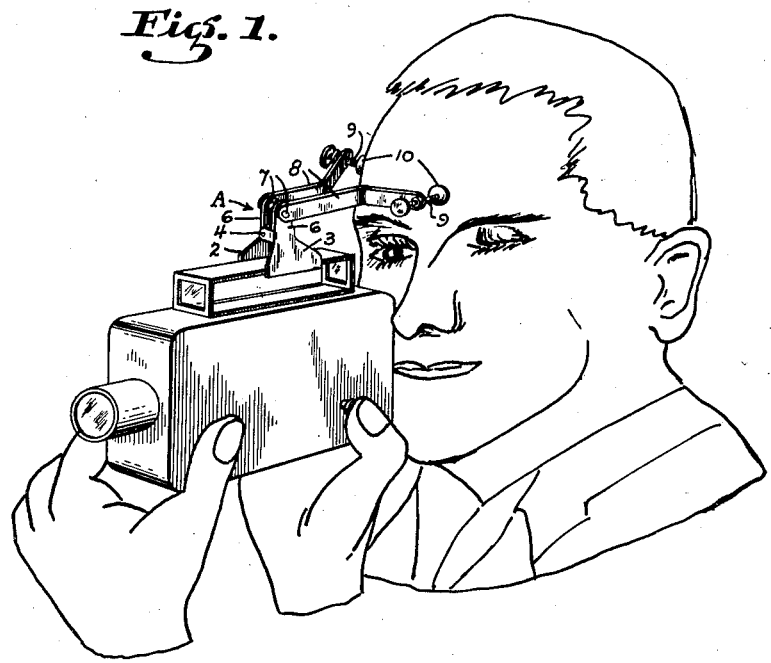

In Fig. 1 of the drawings the clamp is shown as attached to the handle and view-finder of a camera, and when so applied forms, with the camera, a three-point support with relation to the head of the user. That is, the rear end of the camera is pressed against the cheek as shown, and forms one point of support, and as the buttons 10 are pressed against the forehead and engage widely separated parts thereof, two additional points of support are provided, and the camera can thus be rigidly held and pressed against the head in a position where the finder will be properly aligned with the right eye.

Actual experience has shown that the head of the average individual is the steadiest part of the body, or in other words, least subject to vibration, and that it is also possible to turn either the body or head, or both, when the camera is held as shown in Fig. 1, without causing vibration detrimental to the exposure being made. This is an obvious advantage, as many, if not most, moving pictures are taken of moving objects which must be followed with the finder, thereby necessitating almost continuous movement of the camera during the taking of the pictures.

Figure 4:
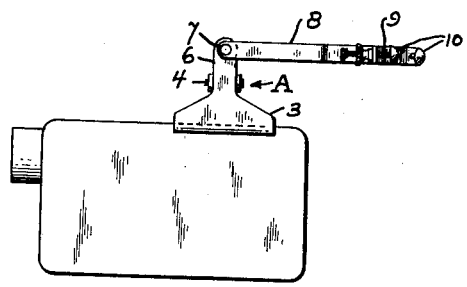
Fig. 4 is a side elevation showing the steady rest applied directly to the body of the camera.

The steady rest shown may be clamped on the handle as shown in Fig. 1, or directly to the body of the camera as illustrated in Fig. 4. The steady rest as a whole is adjustable, as the screws 9 may be adjusted inwardly or outwardly. Furthermore the arms 8 may be bent, and the device may thus be adjusted to fit the forehead and cheek of practically any individual.

Figure 5:
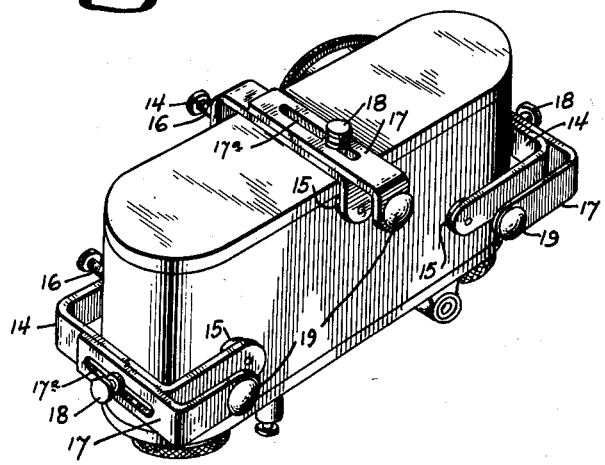
Fig. 5 is a perspective view showing another form of steady rest applied to a camera.
Figure 6:
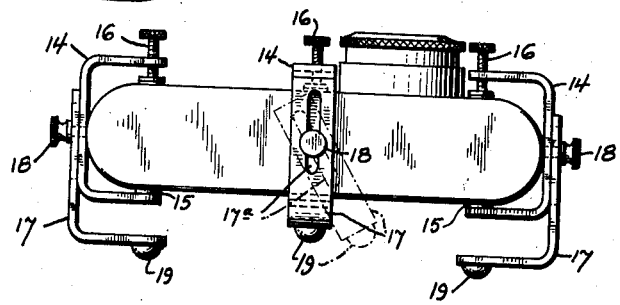
Fig. 6 is a plan view of Fig. 5.
Figure 7:
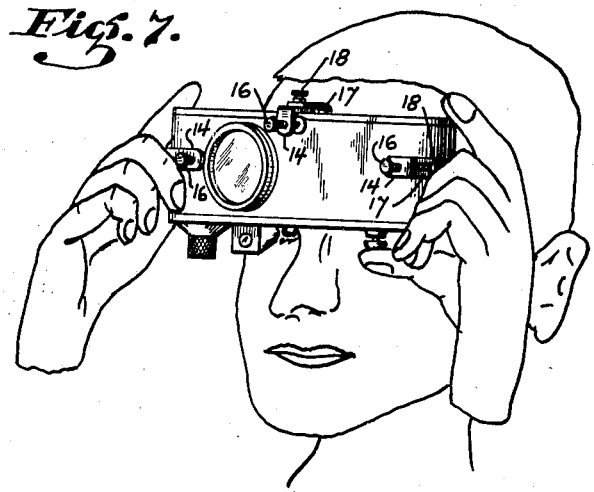
Fig. 7 is a perspective view showing the manner in which the steady rest disclosed in Figs. 5 and 6 is used.

The type of camera shown in Fig. 1 is known as an "Eastman Magazine Movie" camera. In Figs. 5 to 7 a camera known as a "Minicam" is illustrated. In this instance a modified form of clamp is required. The clamp consists of a U-shaped arm 14 having a pad 15 at one end and an adjustable clamping screw 16 at the opposite end. Also, the clamp is provided with an adjustable extension arm 17, held by a clamping screw 18. The arm 17 carries a rubber button 19, and if three clamps are applied to the camera as shown in Figs. 5 and 6, three buttons will be presented and will form a three-point support with relation to the forehead of the user, as shown in Fig. 7. When applying the clamps to a "Minicam" type of camera, it is best to turn the camera upside down, as this permits the camera to be held with the buttons 19 pressed against the forehead. Also, in this position the finder can readily be aligned with the right eye and the film control button is at the same time placed in a position where it is readily manipulated by the thumb of the left hand. Suffice it to say that whether one form of camera or another is employed, a three-point support is formed between the camera and the head of the user. This support is rigid, as any desired pressure may be applied by the hands of the operator, and as the head is substantially vibrationless, the camera will be rigidly supported during the exposure of the films. The clamps may be removed when the camera is not in use, and may be placed in the pocket or other convenient place to be carried about. They are quickly applied or detached, and they are also readily adjustable to suit different individuals.

It should be noted that arms 17 are slotted as at 17a; hence they are not only longitudinally adjustable but may also be swung about the clamping screws 18 to assume an angular position as shown by dotted line in Fig. 6. This angular adjustment is important as it materially increases the range of adjustment.

While certain features of my invention have been more or less specifically described and illustrated, I nevertheless wish it understood that changes may be resorted to within the scope of the appended claims, and that the specific materials and finish of the parts employed may be such as the maker desires or varying conditions demand.

Having thus described and illustrated my invention, what I claim and desire to secure by Letters Patent is:

1. A camera steady rest for disposing a camera in front of the face of a user comprising a clamp to grip a camera, a pair of diverging arms secured thereto, and buttons on the ends of said arms engageable with the forehead of the user and forming, with the camera, a three-point support engaging different portions of the user's face.

2. A camera steady rest for disposing a camera in front of the face of a user comprising a clamp to grip a camera, a pair of diverging arms secured thereto, buttons on the ends of said arms engageable with the forehead of the user and forming, with the camera, a three-point support engaging different portions of the user's face, and means for adjusting the buttons to and away from the arms.

3. A steady rest for disposing a camera in front of a user's face comprising three arms secured to the camera and projecting rearwardly therefrom, a button on each arm for engagement with the face of the user, and means for adjusting the arms to permit the buttons to engage different portions of the user's face to form a three-point support for the camera.

4. A steady rest for disposing a camera in front of a user's face comprising three buttons secured to the rear side of the camera, said buttons being adapted to engage different portions of the user's face to form a three-point support for the camera.

5. A camera steady rest for disposing a camera in front of the face of a user, comprising a pair of clamps to grip the camera, an arm carried by each clamp, and a button on the outer end of each arm engageable with the forehead of the user and forming with the camera a three-point support engaging different portions of the user's face.

VALENTINE F. GREAVES.